June 7, 1927.
P. DEMMEL
1,631,582
DEVICE FOR MILLING POLYGONAL HOLES
Filed Dec. 4, 1925
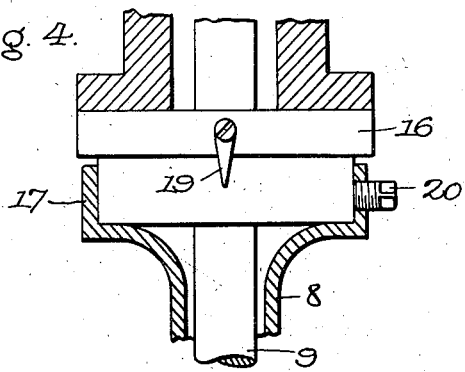
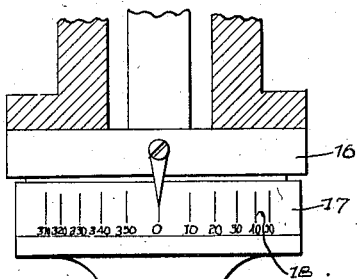
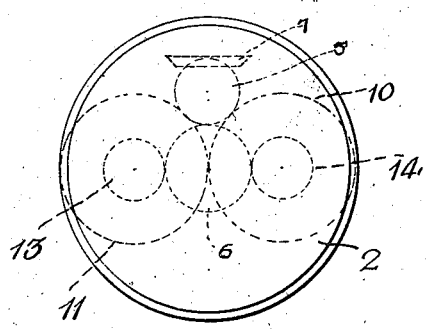
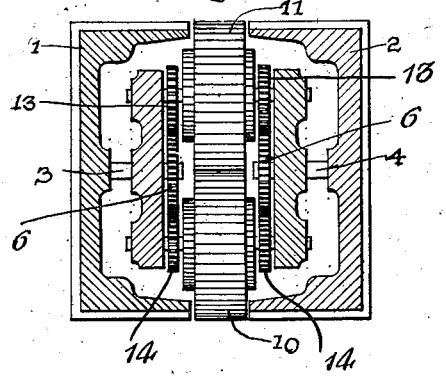
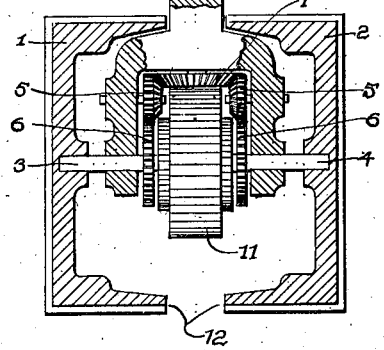
Inventor:-
Paul Demmel,
By Brown, Boettcher & Dienner
Attys Patented June 7, 1927.

1,631,582

UNITED STATES PATENT OFFICE.

PAUL DEMMEL, OF FRANKFORT-ON-THE-MAIN-RODELHEIM, GERMANY.

DEVICE FOR MILLING POLYGONAL HOLES.

Application filed December 4, 1925, Serial No. 73,133, and in Germany January 31, 1922.

This invention relates to devices for drilling or milling polygonal holes and has for its object to facilitate such operations.

Devices for drilling polygonal holes are known which consist of two coaxial roller milling cutters which are pressed into the material to be milled. With such arrangements, however, it is necessary first to drill a round hole as the drilling device is not capable of removing the material which has been left between the two milling cutters.

According to the present invention there are provided auxiliary milling cutters between the two coaxial roller milling cutters preferably in the form of two or more smaller milling cutters with their axes parallel thereto and also rotated. These remove the material which has remained between the milling cutters so that it is possible to produce a rectangular or polygonal hole without preliminary drilling. The drive can be effected in any suitable manner, for example by a rope or belt drive, by any suitable lever or crank transmission, by toothed wheels, by flexible-shafts, by worm gear, by compressed air, electrically or in any other suitable manner.

The production of holes with a larger number of corners than four is possible by reason of the fact that the entire holding spindle of the milling cutter is always turned through a suitable angle in the known manner.

An example of construction of such a device is illustrated in the accompanying drawing wherein:

Figure 1 shows a side elevation, partly in section of the complete tool with driving mechanism, Figure 2 shows a side elevation, Figure 3 a sectional plan of the milling cutter, and Figure 4 is a sectional view through the spindle adjusting means, parts being shown in elevation.

The two roller milling cutters are indicated by 1 and 2; they are mounted on shafts 3 and 4, which, through the medium of toothed gear wheels 5 and 6 are driven from a common bevel wheel 7 mounted on the shaft 9 extending upwardly in the spindle 8. Between the two milling cutters 1 and 2 are located two smaller roller milling cutters 10 and 11 which remove the material from the work-piece which has been left between the two coaxial milling cutters. They are of substantially the same width as the distance 12 between the two milling cutters 1 and 2. They are driven by the toothed gear wheels 13 and 14 from the shafts 3 and 4 of the milling cutters 1 and 2.

When the shaft 9 is rotated then, through the medium of the toothed wheel 7 and the toothed gear wheels 5 and 6, the two milling cutters 1 and 2 and thus, through the medium of the toothed gear wheels 13 and 14, also the roller milling cutters 10 and 11, are rotated. The milling cutters 1 and 2 cut a rectangular hole, in the present case a square hole (see Figure 3) in the material, whilst the material which is left in the space between the two milling cutters 1 and 2, is removed by the milling cutters 10 and 11.

A disc member 16 is secured to the machine and extends into a cooperating disc receiving member 17 at the upper end of spindle 8. The member 17 is secured in adjustment upon member 16 by a suitable clutch or equivalent means, such as a set screw 20 threaded through member 17 and bearing against member 16. This provides simple means for securing the spindle in adjustment about its axis. Member 17 is provided with graduations 18 which move in back of a pointer 19 secured to member 16. By releasing member 17 from member 16 the spindle, and consequently the milling cutters, can be adjusted about a vertical axis, the angle of such adjusting being indicated by the graduations and the pointer 19. This device is used when multicornered holes, for example polygonal or hexagonal holes, are to be drilled. One of the two milling cutters 1 or 2 is removed and the work piece is drilled through by the other half of the milling cutter, whereupon the spindle 8 and thus the whole tool is adjusted at a suitable angle, in accordance with the dividing angle of the polygon to be produced, which can be set by means of the graduations 18, whereupon the next surface of the polygon is cut in the same manner and so on. Any well known or preferred means can be provided for locking discs 16 and 17 together after disc 17 has been adjusted at the proper angle for making the desired cut.

The drive of the various milling cutters may naturally be effected by other means than by toothed wheels, for example by flexible shafts or wire cables, which extend upwardly in the spindle 8 and the like. The latter construction is particularly suitable for very small milling cutters.

What I claim is:—

1. A device for milling polygonal holes comprising two spaced coaxial roller milling cutters and a plurality of roller milling cutters intermediate said two cutters with their axes parallel to that of the cutters first mentioned.

2. A combined milling and drilling device for cutting polygonal holes comprising two spaced coaxial roller milling cutters and intermediate roller milling cutters for operating in the space between said first mentioned cutters.

3. A device for cutting polygonal holes comprising two spaced coaxial roller milling cutters, driving means passing through the space between said cutters and auxiliary roller milling cutters disposed in the gap or space for cutting away material left between said first mentioned cutters.

4. A device for milling polygonal holes comprising a supporting member, two spaced coaxial roller milling cutters mounted upon said member and a plurality of roller milling cutters mounted intermediate said cutters first mentioned for operating in the space or gap between them.

5. A device for milling polygonal holes comprising a supporting member, two spaced coaxial roller milling cutters mounted upon said member, means for driving said milling cutters, located within said supporting member, auxiliary roller milling cutters for operating in the space between said coaxial cutters and means for driving said auxiliary cutters.

6. A device for milling polygonal holes comprising a supporting member mounted for angular movement, means for indicating its angular position with respect to an angularly fixed part, a roller milling cutter mounted upon said supporting member and a plurality of milling cutters also mounted upon said supporting member their axes being parallel to that of the cutter first mentioned to extend the effective cutting surface of said cutter, means for driving said cutters said means being mounted within said supporting member and a bearing formed in said supporting member for mounting a roller milling cutter coaxially with that first mentioned.

7. A device for milling polygonal holes comprising a supporting member, two roller milling cutters coaxially mounted thereon in spaced relation, two smaller roller milling cutters mounted on said supporting member their axes being parallel to that of the coaxial cutters and their cutting surfaces filling substantially the space between said coaxial cutters, and means for driving all of said cutters.

8. A device as claimed in claim 7 wherein the driving means is located within the supporting member.

9. A device as claimed in claim 7 wherein the driving means comprises a rotating shaft and bevel and spur gearing.

10. In a device for milling polygonal holes, a drive shaft, a spindle adjustable about the shaft, a pair of main roller milling cutters coaxially mounted at the lower end of the spindle, supplemental roller milling cutter mounted between the two main cutters, all of said cutters being disposed parallel, and driving connections between the cutters and said shaft.

In testimony whereof I affix my signature.

PAUL DEMMEL.